United States Patent
Stenzel et al.

(10) Patent No.: US 8,753,038 B2
(45) Date of Patent: Jun. 17, 2014

(54) METHOD AND SYSTEM OF A MARINE GEOPHYSICAL SURVEY CABLE RETRIEVER

(75) Inventors: Andre Stenzel, Sugar Land, TX (US);
Troy L. McKey, III, La Place, LA (US);
Youlin Hu, The Woodlands, TX (US)

(73) Assignee: PGS Geophysical AS, Lysaker (NO)

( * ) Notice: Subject to any disclaimer, the term of this patent is extended or adjusted under 35 U.S.C. 154(b) by 331 days.

(21) Appl. No.: 13/193,796

(22) Filed: Jul. 29, 2011

(65) Prior Publication Data

US 2013/0028662 A1    Jan. 31, 2013

(51) Int. Cl.
*F16L 1/24* (2006.01)

(52) U.S. Cl.
USPC .......................................... 405/171; 114/245

(58) Field of Classification Search
USPC .................. 405/171; 114/242, 244–246, 253;
367/4, 20; 441/2, 9, 10
See application file for complete search history.

(56) References Cited

U.S. PATENT DOCUMENTS

| | | |
|---|---|---|
| 3,909,774 A | 9/1975 | Pavey, Jr. |
| 4,823,325 A | 4/1989 | Cole, Jr. |
| 4,928,262 A | 5/1990 | Neeley et al. |
| 5,076,468 A | 12/1991 | Mackal |
| 5,400,922 A | 3/1995 | Weinheimer et al. |
| 5,404,339 A | 4/1995 | Cole, Jr. |
| 5,509,576 A | 4/1996 | Weinheimer et al. |
| 6,019,652 A | 2/2000 | Nielsen et al. |
| 6,533,627 B1 | 3/2003 | Ambs |
| 6,612,886 B2 | 9/2003 | Cole, Jr. |
| 7,475,711 B2 | 1/2009 | Fawcett, Jr. et al. |
| 2011/0049449 A1 | 3/2011 | Scott |

OTHER PUBLICATIONS

Bal Seal Engineering, Inc. (n.d.). Retrieved from http://www.balseal.com/home (Jun. 6, 2011).

*Primary Examiner* — Sean Andrish

(57) ABSTRACT

A marine geophysical survey cable retriever system. At least some of the illustrative embodiments are methods including causing a submerged survey cable to surface. In some cases, causing the submerged survey cable to surface includes: shedding ballast weights when the survey cable reaches or exceeds a first predetermined depth; and inflating a lifting bag when the survey cable reaches or exceeds a second predetermined depth.

20 Claims, 6 Drawing Sheets

METHOD AND SYSTEM OF A MARINE GEOPHYSICAL SURVEY CABLE RETRIEVER

CROSS-REFERENCE TO RELATED APPLICATIONS

This application is related to copending and commonly assigned application Ser. No. 13/193,806 titled "Method and system of depth triggers for marine geophysical survey cable retriever systems", which application is incorporated by reference herein as if reproduced in full below.

BACKGROUND

Marine survey systems are used to acquire data (e.g., seismic, electromagnetic) regarding Earth formations below a body of water such as a lake or ocean. The marine survey systems typically use a plurality of sensor streamers which contain one or more sensors disposed within an outer jacket.

In some situations, one or more sensor streamers may be disconnected from the survey system, the disconnection possibly caused by failure of a coupling mechanism or in some situations the sensor streamer may be severed (e.g., by the propeller of a passing vessel). In some failure scenarios, particularly with sensor streamers filled with alcohol or oil, the sensor streamer becomes negatively buoyant, thus tending to sink. In order to avoid complete loss of the sensor streamer, an inflatable balloon system may trigger, which causes the sensor streamer to surface. However, balloon systems are large and bulky, and create noise in the signals received by some sensor streamers (e.g., sensor streamers comprising hydrophones).

BRIEF DESCRIPTION OF THE DRAWINGS

For a detailed description of exemplary embodiments, reference will now be made to the accompanying drawings in which.

NOTATION AND NOMENCLATURE

Figure 1:
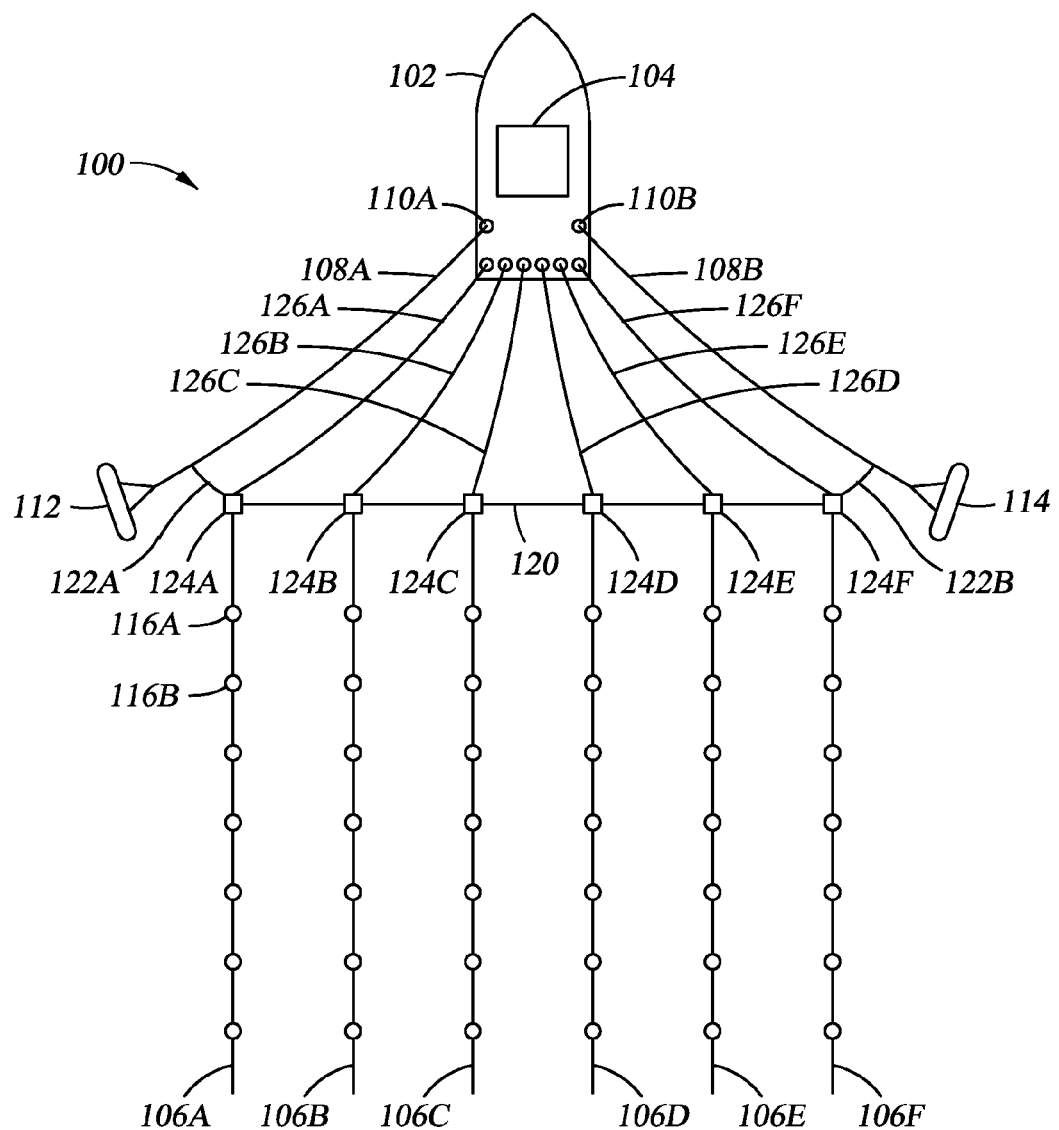
FIG. 1 shows an overhead view of marine survey system in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"About" shall mean plus or minus fifteen percent (15%) of the recited value.

"Gas" in reference to a substance shall refer to the state of the substance at standard atmospheric pressure and temperature. The fact that a substance may be a liquid at certain pressures and/or temperatures shall not obviate the substance's status as a gas.

Displacement of a lifting bag "at the surface" shall mean the weight of water displaced by the lifting bag when the bag is at least partially inflated and an upper-most portion of the lifting bag is within one centimeter of the surface.

With respect to size and/or volume of a cylinder defined in terms of weight of liquid in the cylinder, a cylinder whose internal volume is capable of holding more weight than recited shall not be read to include a lesser recited weight. For example, a cylinder holding 1000 grams of liquid carbon dioxide shall not read on a claim limitation calling for a cylinder containing 100 grams or less.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Various embodiments are directed to retriever systems for geophysical survey cables used in marine surveys. More particularly, at least some embodiments are directed to retriever systems comprising a ballast weight system and a selectively deployable lifting bag system. The ballast weight system enables the user to compensate the cable for buoyancy changes caused by, for example, differences in salinity and temperature of the water within which the marine survey will be performed. However, unlike related-art devices where the ballast weights could be installed and removed only by the use of tools, the ballast weight system may also selectively shed or jettison the ballast weights when the sensor streamer reaches a predetermined depth indicative of potential loss of the cable. The ballast weight system works in conjunction with a selectively deployable lifting bag, and because the ballast weights may be jettisoned the lifting bag system implements a lifting bag (and related components) of significantly smaller size than related-art devices. The specification first turns to an illustrative marine survey system to orient the reader, then to considerations regarding related-art balloon systems, and then to example embodiments.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more streamers 106A-F through the water. While FIG. 1 illustratively shows six streamers 106, any number of streamers 106 may be used. The discussion continues with respect to streamers 106 being sensor streamers, but streamers 106 are illustrative of any towed geophysical survey cable, such as transmitter cables and source cables.

The sensor streamers 106 are coupled to towing equipment that maintains the streamers 106 at selected depth and lateral positions with respect to each other and with respect to the survey vessel 102. The towing equipment may comprise two paravane tow lines 108A and 108B each coupled to the vessel 102 by way of winches 110A and 1108, respectively. The winches enable changing the deployed length of each paravane tow line 108A and 108B. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120, or as illustrated couple to the spreader line by way of spur lines 122A and 122B.

The sensor streamers 106 are each coupled, at the ends nearest the vessel 102 (i.e., the proximal ends) to a respective lead-in cable termination 124A-F. The lead-in cable terminations 124A-F are coupled to or are associated with the spreader lines 120 so as to control the lateral positions of the streamers 106 with respect to each other and with respect to the vessel 102. Electrical and/or optical connections between the appropriate components in the recording system 104 and the sensors (e.g., 116A, 116B) in the streamers 106 may be made using inner lead-in cables 126A-F. Much like the tow lines 108 associated with respective winches 110, each of the lead-in cables 126A-F may be deployed by a respective winch or similar spooling device such that the deployed length of each lead-in cable 126A-F can be changed. The specification now turns to related-art balloon systems.

Figure 2:
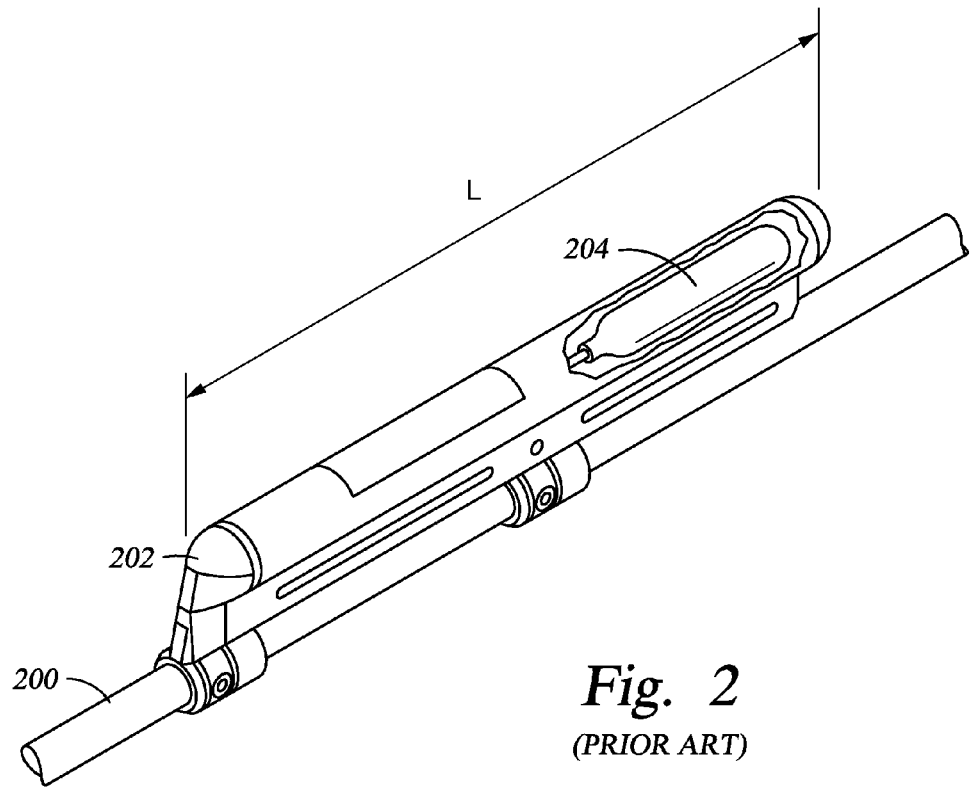
FIG. 2 shows a perspective view of a balloon system.

FIG. 2 shows a perspective, partial cut away, view of a related-art balloon system. In particular, FIG. 2 shows a portion of a sensor streamer 200, and coupled on the sensor streamer 200 is balloon system 202 prior to deployment. Balloon system 202 of the related-art as illustrated is a bulky device, which bulk increases the acoustic noise created as the sensor streamer 200 and balloon system 202 are towed through the water during marine surveys. In some cases, the outside diameter of the balloon system 202 is larger than the outside diameter of the sensor streamer. Moreover, the balloon system 202 as illustrated may have a significant length L—in some cases L on the order of 114 cm.

The size of the balloon system 202 of the related-art may be dictated in part by the lifting force that balloon system is designed to create. For example, a related-art balloon system may be designed to create a lifting force at the surface of about 185 kilograms. Having such a large lifting force correspondingly requires large and bulky components of the balloon system. For example, in order to inflate a balloon to provide the lifting force noted, a gas cylinder 204 (shown in partial cut-away in FIG. 2) may need to hold 1000 grams or more of liquid carbon dioxide. Moreover, in order to inflate a balloon to provide the lifting force the balloon itself comprises a large amount of fabric material, which even in a non-inflated neatly folded arrangement, may be bulky. The large cylinder 204 and other components thus dictate the bulky exterior size, including the significant length L.

Figure 3:
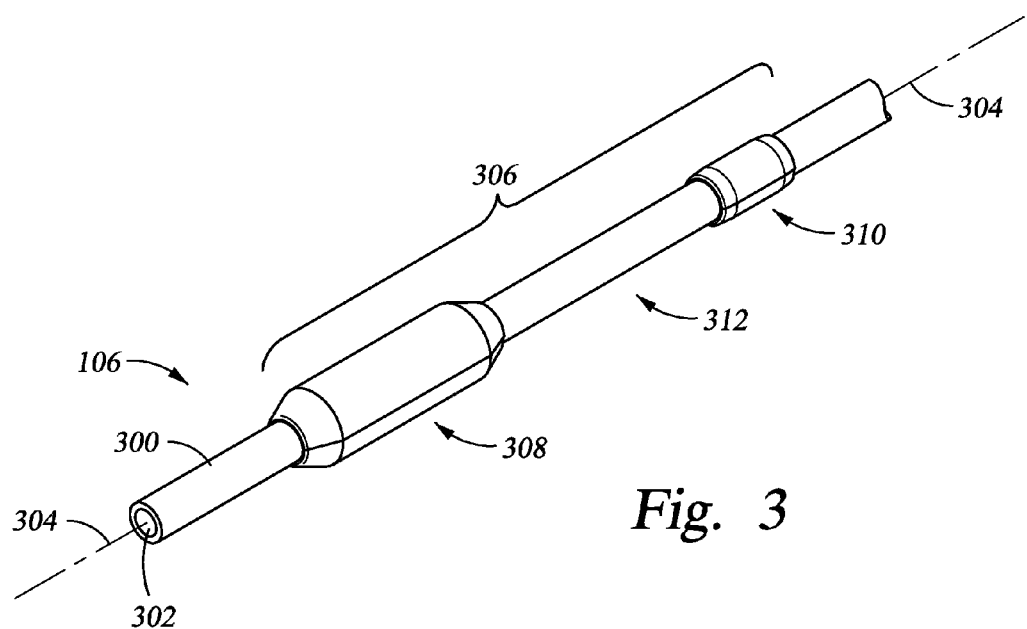
FIG. 3 shows a perspective view of a retriever system in accordance with at least some embodiments.

FIG. 3 shows a perspective view of a retriever system in accordance with at least some embodiments. In particular, FIG. 3 shows a portion of a sensor streamer 106. The sensor streamer 106 has an elongated outer jacket 300 that defines an interior volume 302. The elongated outer jacket defines a central axis 304. Though not specifically shown in FIG. 3, various sensors (e.g., hydrophones, geophones, electromagnetic sensors) associated with the sensor streamer 106 reside within interior volume 302 and are spaced longitudinally along the sensor streamer 106. It is noted that the outer jacket does not necessarily need to be a complete cylinder along the entire length of the cable. There may be sections of the streamer which have no jacket. There may be other sections of the streamer where the jacket makes only a partial cylinder and/or has apertures. In some embodiments, the outer jacket may be a plastic or cloth, and in other embodiments the outer jacket may be a wire mesh or wire windings.

FIG. 3 further shows a retriever system 306 in accordance with at least some embodiments. In particular, a retriever system 306 in accordance with various embodiments comprises a lifting bag system 308 in combination with ballast weight system 310. While FIG. 3 only shows one retriever system 306, it will be understood that a sensor streamer may have a length on the order of less than 2000 meters to in excess of 15000 meters, and thus a plurality of such retriever systems 306 may be spaced along and thus associated with each sensor streamer 106. As illustrated, a portion 312 of the elongated outer jacket 300 may reside between the lifting bag system 308 and ballast weight system 310, and the portion 312 may comprise one or more sensors. In some cases, the retriever systems associated with a sensor streamer may be evenly spaced along the elongated outer jacket, and further the individual lifting bag systems and ballast weight systems evenly spaced, but such even spacing is not strictly required. The specification first turns to the lifting bag system 308 in accordance with various embodiments, and then turns to the ballast weight system 310.

Figure 4:
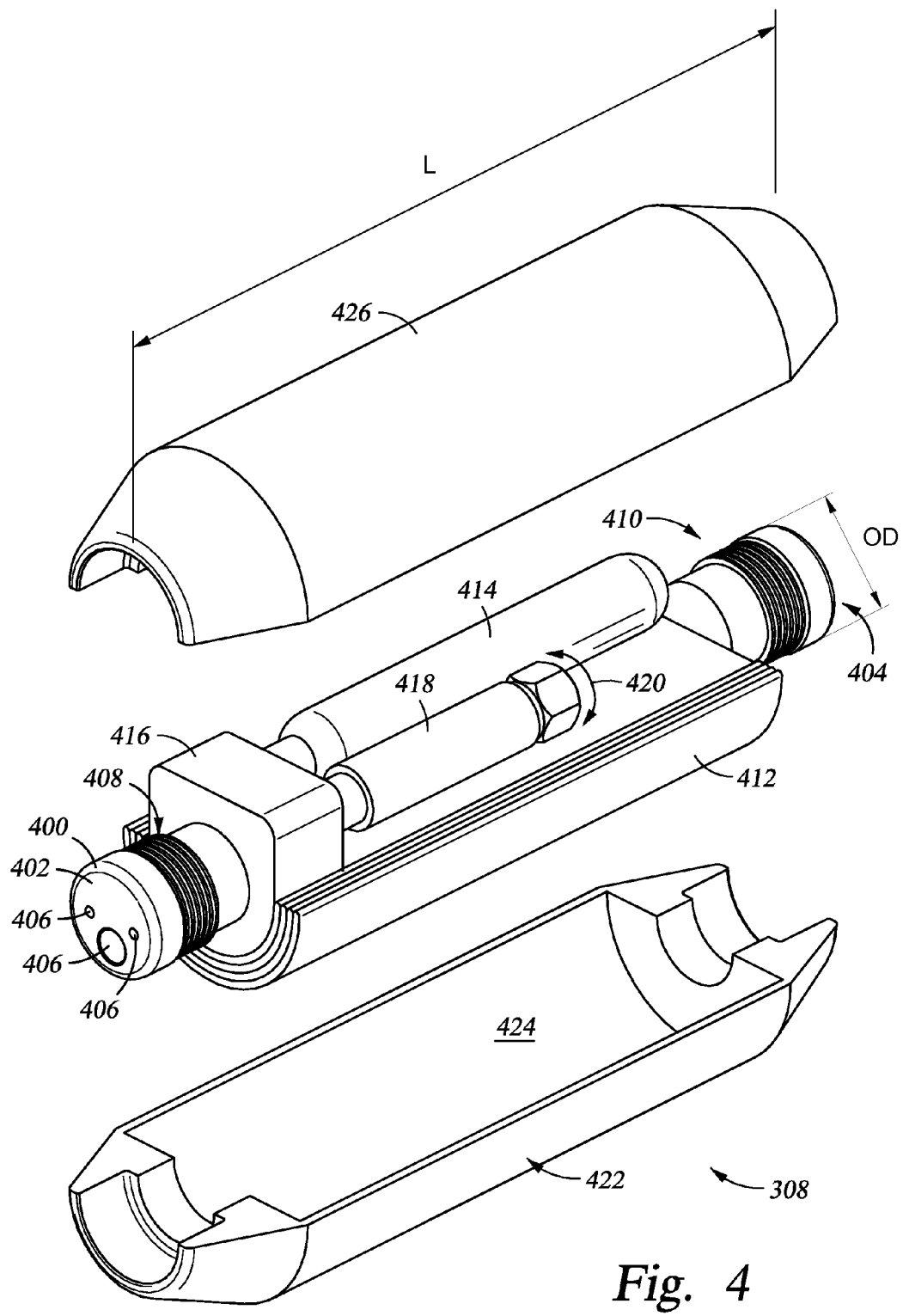
FIG. 4 shows an exploded perspective view of a lifting bag system in accordance with at least some embodiments.

FIG. 4 shows an exploded perspective view of a lifting bag system 308 (in a non-deployed condition) in accordance with at least some embodiments. In particular, the illustrative lifting bag system 308 comprises a bag attachment block 400 that defines a first end 402 and opposite second end 404, both of circular cross-section. The bag attachment block defines a plurality of passages 406 that extend between the first end 402 and the second end 404 of the bag attachment block. It is through the passages 406 that various electrical and/or communicative conductors of the sensor streamer 106 pass, such that power may be provided to the sensors and/or readings taken from the sensors. The first end 402 and second end 404 define an outside diameter (OD) sized to couple to an inside diameter of the elongated outer jacket 300 of the sensor streamer 106. In some cases, the first end 402 and second end 404 may comprise a plurality of grooves 408 and 410, respectively, to assist in the coupling of the ends 402 and 404 to the elongated outer jacket 300. The grooves may take any suitable form, such as rectangular grooves, triangular grooves, or grooves similar to threads, just to name a few. The bag attachment block 400 (including the ends 402 and 404) may be made from any suitable material keeping in mind that the buoyancy of the sensor streamer (with the lifting bag system 308 in a non-deployed state) is designed to be approximately neutrally buoyant. Thus, the bag attachment block 400 may be made from materials such as high density plastic, or light metals. Other materials, and combinations of materials, may be also be used.

The lifting bag system 308 further comprises a bag 412. FIG. 4 shows the lifting bag system 308 with the bag in a deflated and stowed state. When deflated and stowed the bag 412 is folded such the amount of space used to store the bag within the lifting bag system 308 is reduced. The bag 412 in its inflated state may take any suitable shape, such as round or rectangular. When deployed, the bag itself may mechanically couple to the bag attachment block 400 and support the weight of the sensor streamer. In other cases, the bag may be held within a net or lattice of ropes mechanically coupled to the bag attachment block 400. The material from which the bag 412 is constructed may take any suitable form. In some cases, the bag 412 material may be a plastic material, plastic coated fabric, or water tight or water resistant fabric material.

In order to inflate the bag 412 when needed, the lifting bag system 308 further comprises gas cylinder 414 coupled to the bag attachment block 400. The gas cylinder 414 comprises a compressed gas that, when selectively released by trigger mechanism 416, inflates the bag 412. The compressed gas within the cylinder 414 may take any suitable form, such as compressed air, compressed nitrogen, compressed carbon dioxide, or other non-reactive gas. In at least some embodiments, the compressed gas is held at a pressure and temperature where the gas becomes a liquid. More particularly, in some embodiments the compressed gas in the cylinder 414 is liquid carbon dioxide.

The lifting bag system 308 further comprises a trigger mechanism 416. In operation, trigger mechanism 416 monitors the depth of the water surrounding the lifting bag system 308. Trigger mechanism may take any suitable form. For example, trigger mechanism 416 may monitor the pressure of the water surrounding the lifting bag system 308, where the pressure is indicative of the depth of the lifting bag system 308, and thus the depth of the attached sensor streamer. In other cases, the depth may be determined by other mechanism (e.g., sonar depth measurements, acoustic positioning, inertial systems including gyroscopic tracking). Regardless of how detected, when the depth of the lifting bag system 308 meets or exceeds a predetermined depth, the trigger mechanism 416 fluidly couples the compressed gas from the gas cylinder 414 to the internal volume of the bag 412 such that the bag 412 inflates. The trigger mechanism 416 may take many forms. In some cases, the trigger mechanism 416 may be an electro-mechanical system that monitors depth (pressure), and when the predetermined depth is met or exceeded the electro-mechanical system releases the compressed gas from the cylinder 414 (such as by operation of a solenoid, or electrically operating a device to puncture a seal of the cylinder 414). In other embodiments, the trigger mechanism may be a purely mechanical system, where increasing depth (pressure) actuates a trigger where previous stored energy is released (e.g., a compressed spring), and the energy released fluidly couples the compressed gas to the bag 412 (such as by puncturing a seal of the cylinder 414). In a particular embodiment, the predetermined depth may be surface adjustable, such as by turning adjustment mechanism 418, the turning illustrated by double-headed arrow 420.

Still referring to FIG. 4, the lifting bag system 308 further comprises outer cover 422. In some embodiments, the outer cover is a single frangible unit designed and constructed to break away as the bag 412 begins to inflate. Illustrative outer cover 422 is shown as comprising two halves 424 and 426. The covers 424 and 426 may couple to each other and/or a portion of the bag attachment block 400 as appropriate. In a particular embodiment, the outer covers 424 and 426 are designed and constructed to separate from each other as the bag 412 begins to inflate. In another embodiment, the outer covers 424 and 426 are assembled to form the overall outer cover 422 but may be frangible, breaking into smaller pieces as the bag 412 begins to inflate. The outer cover may be made of any suitable material, such as a plastic material.

The relative sizes of the various components of the lifting bag system may be significantly smaller than the related-art balloon systems discussed above. In particular, the lift required of a related-art balloon system was based on a worst case failure scenario for an attached streamer—failure of the outer jacket and loss of fluid buoyancy fill material (e.g., oil, or alcohol) from within the outer jacket. Such a failure scenario dictated large amounts of lift, and correspondingly large balloons and large stored volume of compressed gas. Moreover, related-art balloon systems were not aided in recovery by any other devices—the inflated balloons alone were relied upon to change buoyancy of the streamer. Stated otherwise, related-art retriever systems do not have ballast weights that can be released in the event a depth excursion However, the inventors of the present specification have discovered that the amount of lift from a lifting bag system 308 in accordance with the various embodiments may be significantly lower than related-art balloon systems. In particular, sensor streamers in accordance with the various embodiments utilize buoyancy fill material subject to limited loss in the event of rupture of the outer jacket 300 of the sensor streamer 106. In some cases, a sensor streamer 106 used in the various embodiments has buoyancy fill material in the form of closed cell foam that semi-rigidly adheres to the internal diameter of the outer jacket 300 and/or adheres to itself. In another embodiment buoyancy fill material may be in a form of a gel-like material that adheres to the internal diameter of the outer jacket 300 and/or adheres to itself. Thus, failure of the outer jacket 300 may result in a small portion of the buoyancy fill material detaching and being lost (e.g., that portion of the foam directly subjected to the mechanical force that caused the rupture), but the change in buoyancy of the overall sensor streamer is substantially unchanged.

Thus, the amount of lift created by an inflated bag 412 of a lifting bag system 308 of the various embodiments may be significantly less than the related-art systems, taking into account that less lift may be needed to compensate for buoyancy changes in conjunction with the ballast system 310 that jettisons ballast weight on depth excursions. For example, in a particular embodiment the bag 412 when fully inflated (i.e., inflated to the extent of the compressed gas in the cylinder 414) may produce about 30 kilograms of lift at the surface. Stated differently, the bag 412 when fully inflated may displace about 40 kilograms of water at the surface. Likewise, the amount of compressed gas in the cylinder 414, and the cylinder 414 itself, may be significantly smaller. In some embodiments, the cylinder 414 when full contains 100 grams or less of liquid carbon dioxide, and in a particular embodiment the cylinder when full contains about 80 grams of liquid carbon dioxide. The amount of liquid carbon dioxide may be selected for specific applications.

The lower amount of lift utilized results in a lifting bag system 308 of significantly smaller overall size. For example, in a particular embodiment the assembled lifting bag system 308 (i.e., deflated and stowed bag, and outer covers coupled together over the internal components) the outside diameter of the lifting bag system may be 10 cm or less, and the length L may be 35 cm or less.

Figure 5:
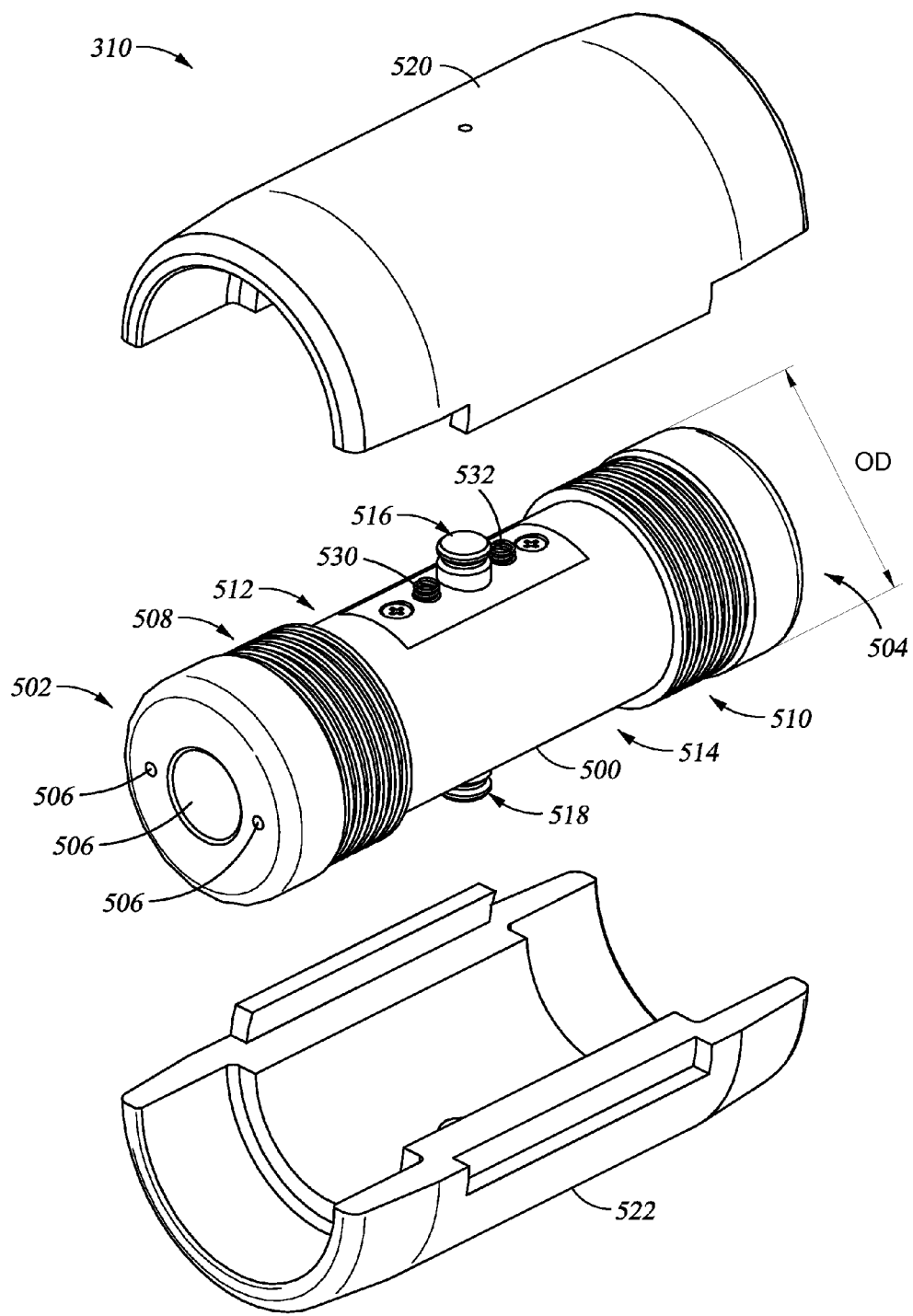
FIG. 5 shows an exploded perspective view of ballast system in accordance with at least some embodiments.

The retriever system 306 of various embodiments further comprises a ballast system 310. FIG. 5 shows an exploded, perspective view of a ballast system 310 in accordance with at least some embodiments. In particular, the illustrative ballast system 310 comprises a ballast attachment block 500 that defines a first end 502 and opposite second end 504, both of circular cross-section. The ballast attachment block defines a plurality of passages 506 that extend between the first end 502 and the second end 504. It is through the passages 506 that various electrical communicative and load carrying conductors of the sensor streamer 106 pass. The first end 502 and second end 504 define an outside diameter (OD) sized to couple to an inside diameter of the elongated outer jacket 300 of the sensor streamer 106. In some cases, the first end 502 and second end 504 may comprise a plurality of grooves 508 and 510, respectively, to assist in the coupling of the ends 502 and 504 to the elongated outer jacket 300. The grooves may take any suitable form, such as rectangular grooves, triangular grooves, or grooves similar to threads, just to name a few. The ballast attachment block 500 (including the ends 502 and 504) may be made from any suitable material keeping in mind that the buoyancy of the sensor streamer is designed to be approximately neutrally buoyant. Thus, the ballast attachment block 500 may be made from materials such as high density plastic, or light metals such as aluminum. Other materials, and combinations of materials, may be also be used.

Illustrative ballast attachment block 500 defines a first attachment location 512 and a second attachment location 514. In the illustrative embodiments of FIG. 5, the attachment locations are not necessarily structurally defined, except in relation to the depth release mechanisms 516 and 518, respectively (only the piston portion of depth release mechanism 518 visible in FIG. 5). In other cases, the attachment locations 512 and 514 may be structurally delineated, such as by grooves, indentions, and/or areas of reduced diameter of the ballast attachment block 500.

The ballast system 310 further comprises a first ballast weight 520 and a second ballast weight 522. It is noted that while FIG. 5 shows the first ballast weight 520 in the upper orientation, and second ballast weight in the lower configuration, any rotational orientation of the weights are possible. Though FIG. 5 is a perspective view, in an operational configuration the first ballast weight 520 abuts the ballast attachment block 500 at the first attachment location 512, and if used the second ballast weight 522 abuts the ballast attachment block 500 in the second attachment location 514. In the illustrative embodiments of FIG. 5, the ballast weights 520 and 522 mechanically couple to the ballast attachment block 500 by way of their depth release mechanisms 516 and 518, respectively. Example depth release mechanisms are discussed in greater detail below.

The ballast weights may be constructed of any suitable substance. For example, in some cases the ballast weights are lead or bronze. In at least some embodiments, each ballast weight 520, 522 weighs approximately 1 kilogram. Thus, if both ballast weights are attached to the ballast attachment block 500, the ballast system 310 may add approximately 2 kilograms to the overall weight of the attached sensor streamer. The ballast weights are added to ballast attachment blocks along the length of a sensor streamer to adjust the buoyancy of the sensor streamer. That is, the sensor streamer may be designed and constructed to be substantially neutrally buoyant in water of a particular salinity and temperature. However, marine surveys may be taken in a variety of locations and a variety of local conditions, and thus the ballast weights may be added and/or removed at the surface to compensate for the specific salinity and temperature of water expected. In cases where only one ballast weight is used at a particular ballast attachment block, a dummy cover, weighing substantially less than a ballast weight, may be placed at the unused attachment location.

Ballast systems 310 in accordance with the various embodiments have the ability to shed or jettison one or more of the ballast weights if the sensor streamer reaches or exceeds a predetermined depth indicative of disconnection of the sensor streamer from the survey vessel. In particular, the depth release mechanisms 516 and 518 are designed and constructed to retain the respective ballast weights at the attachment locations during operation. However, in the event the sensor streamer reaches or exceeds a predetermined depth, the depth release mechanism 516 and 518 are configured to release their respective ballast weights, thus making the overall sensor streamer more positively buoyant. In some cases the depth release mechanisms are set to release their respective ballast weights at the same predetermined depth. In yet still other cases, one depth release mechanism may be set to release at a more shallow depth than the second depth release mechanism. Thus, if release of the first ballast weight (possibly in combination with deploying the lifting bag system 306) does not result in sufficient change in buoyancy and the sensor streamer continues to sink, then the second ballast weight can be released.

In some cases the depth release mechanisms decouple the attached ballast weight, and enable the ballast weight to fall off under force of gravity. For downward facing ballast weights, disconnection may be sufficient; however, for upward facing ballast weights, even a disconnect ballast weight may ride the ballast attachment block 500. Thus, in some embodiments the ballast system 310 comprises a system to push a disconnected ballast weight away from the ballast attachment block 500. In some cases, one or more spring members may be associated with a ballast weight such that, once disconnected, forces tending to push the ballast weight away from the ballast attachment block 500 are enabled to operate. The one or more springs are illustrated in FIG. 5 by coil springs 530 and 532 associated with depth release mechanism 516. Coil springs 530 and 532 are merely illustrative, and other spring members may be used, such as leaf springs and other resilient material (rubber), or combinations.

Figure 6:
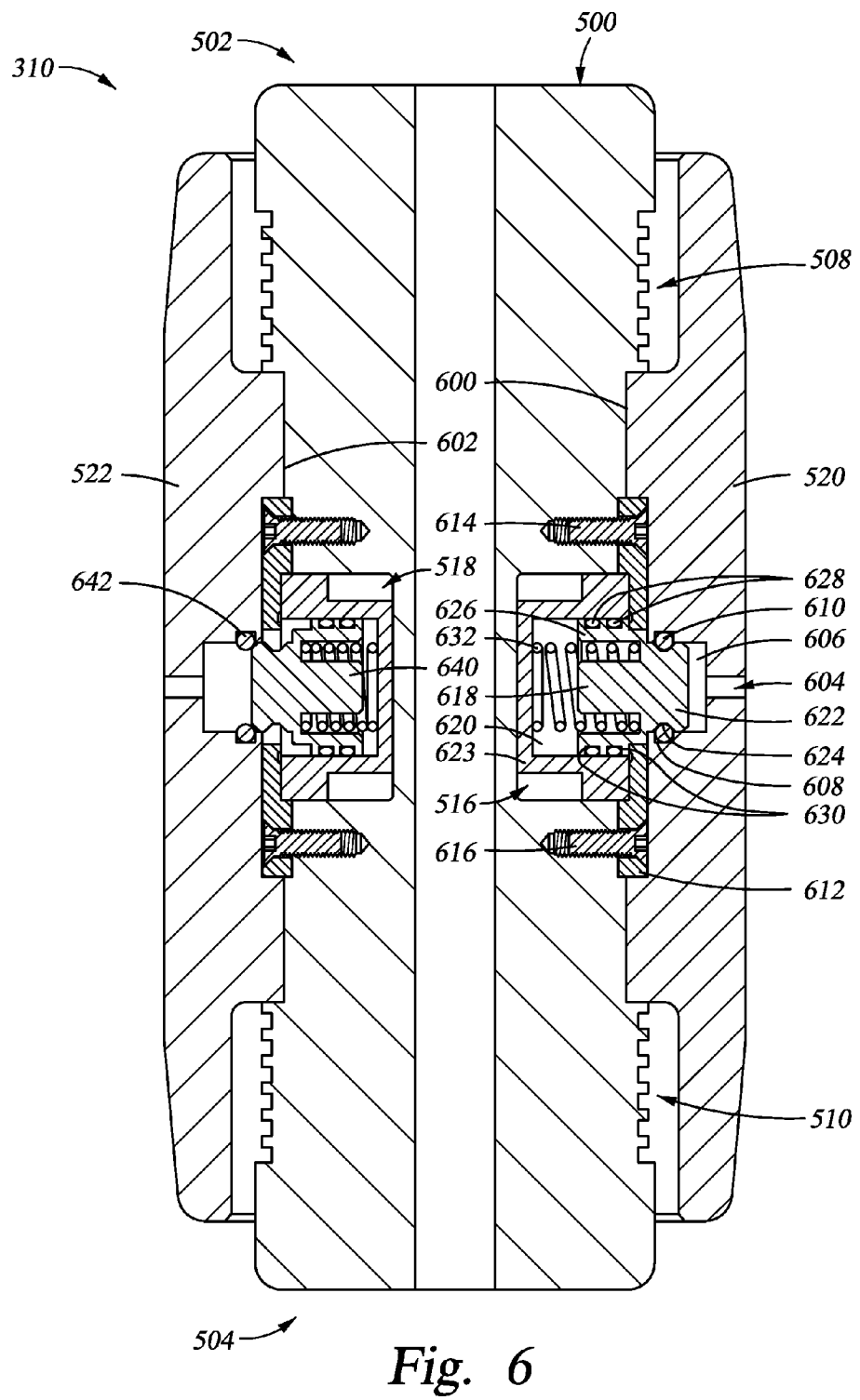
FIG. 6 shows a cross-sectional view of a ballast system in accordance with at least some embodiments.

FIG. 6 shows a cross-sectional view of a ballast system 310 in accordance with at least some embodiments. In particular, FIG. 6 shows the ballast attachment block 500 having the first ballast weight 520 and second ballast weight 522 in an abutting relationship with the ballast attachment block 500. The ballast attachment block 500 differs from that of FIG. 5 in that the attachment locations are more delineated, the delineation in the form of reduced outside diameter portions 600 and 602. Moreover, FIG. 6 illustrates that the grooves 508 and 510 may likewise define a smaller outside diameter than more distal portions of the first end 502 and second end 504, respectively. For example, the elongated outer jacket may telescope over and end 502 or 504, and then be held in place by a mechanical member, such as a band that circumscribes the elongated outer jacket at the location of the grooves.

Referring to ballast weight 520 as representative, ballast weight 520 comprises a first aperture 604 in fluid communication with a second aperture 606. As illustrated, the second aperture 606 may be circular and has an inside diameter larger than the first aperture 604, but other relationships are contemplated. The second aperture 606 defines an internal annular groove 608 within which a retention member 610 is disposed. Illustrative groove 608 has a rectangular cross-section, but other cross-sectional shapes for the internal annular groove 608 (e.g., circular, triangular, or semi-circular) may be used.

Illustrative depth release mechanism 516 of FIG. 5 comprises retention plate 612, which may be attached to the ballast attachment block by way of fasteners within threaded apertures 614 and 616. While FIG. 5 illustrates the use of threaded fasteners, any suitable attachment system may be used. The retention plate retains the piston member 618 at least partially within a chamber 620. As illustrated, the chamber 620 is defined within a chamber block member 623, but in other cases the chamber 620 may be defined directly by a blind aperture in the ballast attachment block 500. The piston member 618 defines a retention portion 622 having an external annular groove 624. Illustrative external annular groove 624 has a triangular cross-section, but other cross-sectional shapes for the external annular groove 624 (e.g., circular, rectangular, or semi-circular) may be used.

Still referring to FIG. 6, the piston member further comprises chamber portion 626 that resides within the chamber 620. As illustrated, the chamber portion 626 seals against the internal diameter of the chamber 620, for example, by way of O-rings 628 in respective grooves 630. Other sealing mechanisms may be used. Also within the chamber 620 is spring member in the form of a coil spring 632. The pressure of the gas (e.g., air) within the chamber, as well as the force created by compression of the illustrative coil spring 632, tend to bias the piston member into an extended orientation, as shown by depth release mechanism 516.

The ballast weight 520 couples to the ballast attachment block, at least in part, by way of the retention portion 622 of the piston member 618. More particularly, when the piston member 618 is fully extended, the internal annular groove 608 of the second aperture 606 is in operational relationship to the external annular groove 624 of the retention portion 622. The retention member 610 couples between the internal annular groove 608 of the second aperture 606 and the external annular groove 624 of the retention portion. In accordance with various embodiments, the shear strength of the retention member 610 enables a sufficient force to be applied to hold the ballast weight 520 in the abutting relationship in operation (e.g., use during a marine survey).

In at least some embodiments, when the ballast system 310 is at the surface, the piston member 618 will tend to be in its most extend orientation. In operation, as the ballast system 310 increases depth in the water, increased pressure (communicated at least in part through the apertures 604 and 606) will tend to force the piston member 618 to retract into the chamber 620. The gas within the chamber 620 compresses with greater retraction, and thus tends to resist movement. Likewise, the illustrative coil spring 632 develops more force with compression, also tending to resist movement. Further still, the retention member 610 provides at least some resistance to shear forces created as the piston member 618 attempts to retract, and thus the retention member 610 resists movement of the piston member 618.

However, the force applied to the piston member 618 with increasing external pressure (i.e., increasing depth) eventually overcomes the various mechanical forces resisting movement of the piston member 618. In a least some embodiments the retention member 610 is deformable, and thus while being sufficiently resilient to hold the ballast weight 520 in the abutting relationship, the force exerted by the water at sufficient depth eventually deforms the retention member 610 to the point the piston member 618 can slide past the member 610 and fully retract. Once the piston member 618 slides past the retention member 610, the ballast weight 520 is effectively released, and can fall away. The piston member 640 of depth release mechanism 518 is shown in a fully retracted orientation, having slid past the retention member 642.

Thus, the combination of the cross-sectional area of the retention portion 622 of the piston member 618, the initial pressure of the gas within the sealed chamber 620, the spring force of illustrative coil spring 632, and the shear strength and/or retention force of the retention member 610 set the predetermined depth at which the representative depth release mechanism 516 releases the ballast weight 520.

In other embodiments, the representative depth release mechanism 516 may vary in operation. For example, if retention member 610 provides a sufficient amount resistance to shear deformation, the spring 632 may be omitted. Likewise, the pressure within the sealed chamber 620 may be lower (even a vacuum in some cases) if the pressure at which the retention member 610 sufficiently deforms to enable the retention portion 622 to slide past is predictable and repeatable. Moreover, while illustrative FIG. 6 shows only one retention member, multiple retention members, with corresponding multiple annular grooves, may be used for a single ballast weight.

Figure 7:
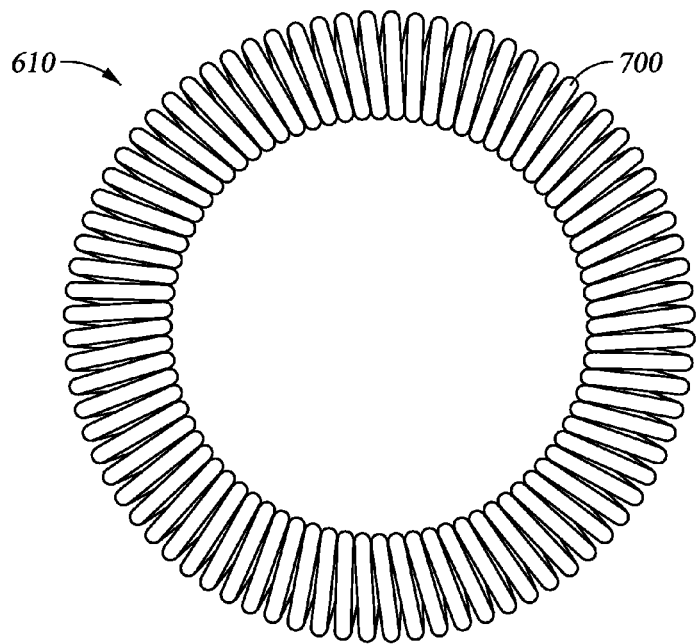
FIG. 7 shows an overhead view of retention member in accordance with at least some embodiments.

Representative retention member 610 may take any suitable form. In some cases, a resilient material, such as an O-ring, may provide sufficient resistant to deformation caused by shear forces to be operational. However, in other cases the representative retention member may be a coil spring wrapped to be in toroidal form. FIG. 7 shows an overhead view of a retention member 610 in the form a coil spring 700 wrapped into a toroidal shape. The wire of the coil spring 700 provides good resistance to deformation by shear forces, but will eventual deform sufficiently to enable the retention portion to slide past. Moreover, the coil spring 700 wrapped into a torodial shape may be reusable many times over, whereas other retention members 610 (e.g., O-rings) may tend to tear under the induced shear forces.

In view of illustrative coil spring 700 wrapped into a torodial shape, it is noted that the retention member 610 need not seal against the internal diameter of the aperture 606 or seal against the retention portion 622. However, in some cases, the nature of the retention member 610 may result in a seal being formed (e.g., retention member in the form of O-ring).

Figure 8:
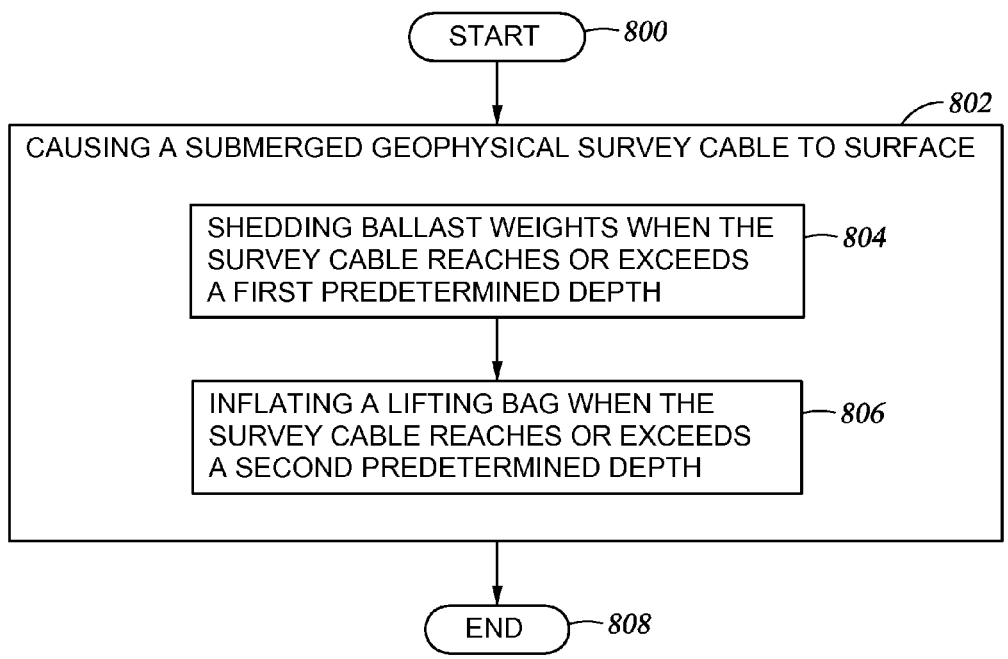
FIG. 8 shows a method in accordance with at least some embodiments.

FIG. 8 shows a method in accordance with at least some embodiments. In particular, the method starts (block 800) and comprises causing a submerged geophysical survey cable to surface (block 802). In some cases, causing the submerged survey cable to surface may comprise: shedding ballast weights when the survey cable reaches or exceeds a first predetermined depth (block 804); and inflating a lifting bag when the survey cable reaches or exceeds a second predetermined depth (block 806). Thereafter, the method ends (block 808). In some cases, the method is repeated for a plurality of retriever system along a survey cable.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
causing a submerged geophysical survey cable to surface by
shedding ballast weights when the survey cable reaches or exceeds a first predetermined depth; and
inflating a lifting bag when the survey cable reaches or exceeds a second predetermined depth.

2. The method of claim 1 wherein inflating the lifting bag further comprises inflating the lifting bag with a displaced volume of the lifting bag providing 50 kilograms or less of lift at the surface.

3. The method of claim 1 wherein inflating the lifting bag further comprises inflating the lifting bag with a displaced volume of the lifting bag providing about 40 kilograms of lift at the surface.

4. The method of claim 1 wherein inflating the lifting bag further comprises inflating by way of a compressed gas cylinder that initially contains 100 grams or less of liquid carbon dioxide.

5. The method of claim 1 wherein inflating the lifting bag further comprises inflating by way of a compressed gas cylinder that initially contains about 80 grams of liquid carbon dioxide.

6. The method of claim 1 wherein the first predetermined depth and the second predetermined depth are the same depth.

7. The method of claim 1 wherein the second predetermined depth is more shallow than the first predetermined depth.

8. A system comprising:
a geophysical survey cable comprising an outer surface:
a ballast system coupled to the survey cable, the ballast system comprising:
a ballast attachment block defining a first end and a second end, the first end coupled to the outer surface of the survey cable;
a ballast weight;
a depth release mechanism coupling the ballast weight to the ballast attachment block, the depth release mechanism configured to release the ballast weight from the ballast attachment block when the ballast system reaches or exceeds a first predetermined depth in water;
a lifting bag system comprising:
a bag attachment block defining two ends, at least one end coupled to the outer surface of the survey cable;
a lifting bag coupled to the bag attachment block, the lifting bag deflated;
a gas cylinder coupled to the bag attachment block, the gas cylinder storing a compressed gas; and
a trigger mechanism coupled to the bag attachment block, the trigger mechanism configured to fluidly couple the gas to the lifting bag when the lifting bag system reaches or exceeds a second predetermined depth in the water.

9. The system of claim 8:
wherein the ballast weight comprises an aperture defining an internal annular groove;
wherein the depth release mechanism comprises:
a piston defining an external annular groove, a distal end of the piston extending into the aperture of the ballast weight;
a chamber defining an internal diameter, the piston extends into and seals against the internal diameter, the chamber and piston define a sealed volume, wherein increasing water depth causes force that retracts the piston into the chamber;
a member disposed between the external annular groove of the piston and the internal annular groove of the ballast weight, the member deformable as the piston retracts into the chamber.

10. The system of claim 8 wherein the lifting bag system further comprises:
an outside diameter of 10 centimeters (cm) or less; and
an axial length of 35 cm or less.

11. The system of claim 8 wherein the lifting bag, when inflated by the gas in the gas cylinder, displaces 50 kilograms or less of water at the surface.

12. The system of claim 8 wherein the lifting bag, when inflated by the gas in the gas cylinder, displaces about 40 kilograms of water at the surface.

13. The system of claim 8 wherein the gas cylinder contains 100 grams or less of liquid carbon dioxide.

14. The system of claim 8 wherein the gas cylinder contains about 80 grams or less of liquid carbon dioxide.

15. The system of claim 8 wherein the first and second predetermined depth are the same depth.

16. A ballast system comprising:
a ballast attachment block comprising:
a first end and a second end, each end defining an outside diameter configured to couple to an inside diameter of a geophysical survey cable;
a first attachment location medially disposed on the ballast attachment block;
a passage extending between the first end and the second end, the passage disposed within the ballast attachment block;
a first ballast weight abutting the first attachment location;
a first depth release mechanism coupling the first ballast weight to the ballast attachment block, the first depth release mechanism configured to release the ballast weight from the first ballast attachment block when the first depth release mechanism reaches or exceeds a first predetermined depth in water.

17. The ballast system of claim 16:
wherein the ballast attachment block further comprises a second attachment location, the second attachment location distinct from the first attachment location; and further comprising
a second ballast weight abutting the second attachment point, the second ballast weight distinct from the first ballast weight;
a second depth release mechanism coupling the second ballast weight to the ballast attachment block, the second depth release mechanism configured to release the second ballast weight from the ballast attachment block when the second depth release mechanism reaches or exceeds a second predetermined depth in water.

18. The ballast system of claim 17 wherein the first and second predetermined depths are the same depth.

19. The ballast system of claim 16 wherein the first depth release mechanism further comprises:
a piston defining an external annular groove, a distal end of the piston extending into the aperture of the ballast weight;
a chamber defining an internal diameter, the piston extends into and seals against the internal diameter, the chamber and piston define a sealed volume, wherein increasing water depth causes force that retracts the piston into the chamber;
a member disposed between the external annular groove of the piston and an internal annular groove of an aperture through the ballast weight, the member deformable as the piston retracts into the chamber.

20. The ballast system of claim 19 wherein the member is a toroidal shaped coil spring.

\* \* \* \* \*